United States Patent
Suyama et al.

(10) Patent No.: US 6,217,997 B1
(45) Date of Patent: Apr. 17, 2001

(54) CERAMIC FIBER REINFORCED CERAMIC MATRIX COMPOSITE MATERIAL AND METHOD OF PRODUCING THE SAME

(75) Inventors: Shoko Suyama, Yokohama; Tsuneji Kameda, Tokyo; Masahiro Asayama, Yokohama; Nagatoshi Okabe, Yokohama; Hideyuki Hirata, Yokohama; Hiroshi Ichikawa, Yokohama; Yoshikazu Imai, Tokyo; Shiro Mitsuno, Yokohama; Satoshi Miyazaki, Tokyo, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,613

(22) PCT Filed: Sep. 12, 1995

(86) PCT No.: PCT/JP95/01805
§ 371 Date: Mar. 11, 1997
§ 102(e) Date: Mar. 11, 1997

(87) PCT Pub. No.: WO96/08453
PCT Pub. Date: Mar. 21, 1996

(30) Foreign Application Priority Data

Sep. 12, 1994 (JP) .................................................. 6-242394
Oct. 13, 1994 (JP) .................................................. 6-248038

(51) Int. Cl.$^7$ ........................................................ B32B 18/00
(52) U.S. Cl. ................................. 428/293.4; 428/294.1; 428/294.4
(58) Field of Search ............................ 428/293.4, 294.4, 428/294.1

(56) References Cited

U.S. PATENT DOCUMENTS 4,642,271   2/1987   Rice .
5,015,540   5/1991   Borom et al. .

FOREIGN PATENT DOCUMENTS 0 209 320 A1   7/1986   (EP) .

*Primary Examiner*—Elizabeth M. Cole
(74) *Attorney, Agent, or Firm*—Oblon, Spivak, McClelland, Maier & Neustadt, P.C.

(57) ABSTRACT

According to a ceramic fiber reinforced ceramic matrix composite material of the present invention, a ceramic fiber reinforced ceramic matrix composite material 1 comprises a composite ceramic matrix, and a preform 5 resulting from a fiber bundle 3 obtained by bundling a plurality of ceramic fibers 2 and disposed therein, and is characterized in that a first ceramic matrix M1 is formed in an inner space of the fiber bundle 3 and at a region adjacent to an outer periphery thereof, and a second ceramic matrix M2 is formed in an inner space of the preform 5 and at an outer peripheral region thereof, the space and region of the preform being defined except for those of the fiber bundle. Also characteristically, ceramic fibers are compositely disposed in a fiber volume fraction (Vf) of greater than 10% in a reaction-sintered ceramic matrix. It is further preferred that the composite material be provided on a surface thereof with a coat layer composed solely of a ceramics and having a thickness of not less than 50 μm.

14 Claims, 2 Drawing Sheets

CERAMIC FIBER REINFORCED CERAMIC MATRIX COMPOSITE MATERIAL AND METHOD OF PRODUCING THE SAME

TECHNICAL FIELD

The present invention relates to ceramic fiber reinforced ceramic matrix composite materials and, in particular, to such a composite material which has a matrix structure controlled for a matrix to be uniformly disposed even in an inner space between ceramic fibers in order to improve initial matrix cracking strength and fracture energy and thus offers great reliability and high durability.

Furthermore, the present invention relates to a ceramic fiber reinforced ceramic matrix composite material that is dense in nature and excellent both in strength and in toughness and hence is suitable especially for use as structural parts not only in gas turbine components which should necessarily be great in regard to mechanical characteristics and reliability requirements at elevated temperature, but also in aircraft components, atomic power components and the like, and also to a method of producing that fiber reinforced composite material.

BACKGROUND ART

Sintered ceramic materials have been used, in various industrial sectors, as electronic and structural materials for heavy electrical components, aircraft components, automobile components, electronic equipment components, precision machinery components, semiconductor equipment and the like. This is due to the fact that, in general, the sintered ceramic materials are less likely to decline in strength even at high temperatures than and moreover are superior to metallic materials in common use in respect of a large number of physical characteristics such as hardness, electrical resistance, abrasion resistance, heat resistance, corrosion resistance, weight saving and the like.

The sintered ceramic material noted above, however, is deficient in that owing to its smaller tensile stress than its compression stress, it is brittle as usually termed so and hence is liable to get instantaneously broken under rather small a tensile stress. For that reason, it has been strongly demanded that sintered ceramics be enhanced as regards its toughness and breaking energy with a view to rendering ceramic components applicable to those parts requiring high reliability.

Namely, ceramic structural parts for use as components of gas turbines, aircraft, automobiles and the like should be resistant to heat and strong at elevated temperature and besides high in reliability. In this respect, researches are being made at institutes at home and abroad in an effort to put to practical use a composite ceramic material which is designed to afford toughness, breaking energy and other properties at a high level by addition of a reinforcement such as an inorganic material- or metal-induced fiber, a whisker, a plate, a powder or the like to a sintered matrix in compositely dispersed manner.

For instance, certain ceramic-based composite fiber materials have been developed which are obtained with use of a ceramic matrix that is formed by bundling 500–3000 long fibers of ceramics, each fiber of about 10 $\mu$m in diameter, to thereby prepare a fiber bundle (yarn), and by orienting a plurality of fiber bundles in a two- or three-dimensional direction, or by weaving them together into a preform of a given shape (fiber preform), followed by formation of a matrix in the preform as by a CVI method (Chemical Vapor Infiltration method). Alternatively, a ceramic matrix is derived by filling particulate ceramics in the above preform by means of cast molding and subsequently by sintering the resultant molding to form a matrix in which fibrous ceramics are thereafter disposed in composite condition.

Some of the ceramic-based fiber composite materials discussed above are sufficiently effective in increasing fracture toughness and fracture energy and are highly conducive to improved reliability insofar as they are in the form of a specimen on a relatively small scale. However, such a fiber composite material has the problem that when in actual use for large-sized components, particularly for thick-walled components, it causes a sharp decline in strength and fracture energy. Another problem is that the fiber composite material is not easily applicable to components of a complicated shape. Still another problem is that the above fiber composite material has monofilaments or fiber bundles oriented simply in one direction and hence tends to become anisotropic with respect to its material characteristics, and this means that the fiber composite material fails to adequately cope with a wide variety of product shapes.

Where the above conventional methods are employed to form a matrix, it is virtually difficult to fill the matrix interiorly of a fiber bundle or a fiber preform in uniform and dense condition. When a matrix is formed for example by the CVI method previously mentioned, the filling ratio of a matrix has been found to be in the order of 70–90% at most irrespective of the case with a fiber bundle or a fiber preform, and a matrix can only be obtained with more voids in the preparation of thick-walled components. Extended matrix formation is further involved so that production efficiency is extremely reduced.

On the other hand, matrix formation resulting from cast molding of powder ceramics enables a matrix to be filled in a fiber preform except for a fiber bundle in a ratio of about 90%–100%. The ceramics, however, causes reduced filling ratio when filling in a minute fiber bundle constituted with a plurality of fibers each of about 10 $\mu$m in diameter. Thus, the resultant composite material as a whole invites irregularly varied ratio of matrix filling and entails low initial cracking strength of the matrix and small fracture energy of the composite material after crack initiation, eventually failing to gain great reliability.

As noted above, the ceramic-based fiber composite materials of the prior art have been molded to date into various trial products but at a small or specimen level. There is left the problem that no methods have been yet established as to the production of large-sized components, especially thick-walled equivalents, from those composite materials. Consequently, it is difficult to shape such a composite material as desired and also to control the same microstructurally with the result that those characteristics typified by strength, toughness and the like are still unfeasible to a full and stable extent.

In addition, no definite methods of evaluating the characteristics of composite ceramic materials per se have been established, nor have any standards been provided which could be relied upon in detailed material design as well as product design and component design. These circumstances pose an obstacle to the progress and practice of composite ceramic materials.

The present invention has been made to eliminate the foregoing problems. A first object of the invention is to provide a ceramic-based fiber composite material which exhibits great reliability and high toughness by way of uniform formation of a constituent matrix to enhance initial matrix cracking strength and fracture energy.

A second object of the present invention provides a method of the production of a ceramic-based fiber composite material that is adequately adaptable to various product shapes and also excellent particularly both in strength at elevated temperature and in toughness, which method comprises controlling such composite material microstructurally to afford these characteristics.

DISCLOSURE OF THE INVENTION

To achieve the first object set forth hereinabove, a first aspect of the present invention provides a ceramic fiber reinforced ceramic matrix composite material having a composite ceramic matrix and a fiber preform resulting from a fiber bundle obtained by bundling a plurality of ceramic fibers and disposed therein, characterized in that a first ceramic matrix is formed in an inner space of such fiber bundle and at a region adjacent to an outer periphery thereof, and a second ceramic matrix is formed in an inner space of such fiber preform and at an outer peripheral region thereof, the space and region of such fiber preform being defined except for those of such fiber bundle.

Here, the first matrix is composed of a ceramics derived by synthesizing a main ingredient of an organic compound (ceramic precursor) as a starting material which is convertible into a matrix upon pyrolysis or sintering, a ceramics obtained by a chemical vapor infiltration method (CVI method), or a ceramics obtained from a powder of a small particle diameter as a starting material which is apt to sufficiently fill in a fiber bundle. The second ceramic matrix is characteristically composed of a ceramics obtained by use of a powder ceramics as a starting material.

Moreover, a continuous fiber may be preferably used, as the ceramic fiber, which is provided on a surface thereof with a slide layer containing at least one member of carbon (C) and boron nitride (BN). The first and second ceramic matrices can be of one and the same main ingredient. Either one of the first and second ceramic matrices can be made up of a sintered material derived by reaction sintering. The void fraction of the finished composite material should preferably be set to be not greater than 10% by volume.

To achieve the second object set forth hereinabove, a second aspect of the present invention provides a ceramic fiber reinforced ceramic matrix composite material characterized in that fibrous ceramics is compositely disposed in a fiber volume ratio (Vf: volume fraction) of greater than 10% in a reaction-sintered ceramic matrix. It is preferred that such composite material be provided on a surface thereof with a coat layer of more than 50 $\mu$m in thickness made up of a matrix alone. Also characteristically, the fibrous ceramics is a continuous fiber provided on a surface thereof with a slide layer containing at least one of carbon and boron nitride (BN).

It is also preferred that an interfacial layer be disposed at an interface between the slide layer of the ceramic matrix and the reaction-sintered matrix, the interfacial layer being composed predominantly of at least one member of $Si_3N_4$, SiC and $SiO_2$ and having a thickness of not smaller than 0.1 $\mu$m. This interfacial layer allows the slide layer to act in effective manner.

The interfacial layer referred to above can be formed by a usual mode of CVD (Chemical Vapor Deposition) or of reaction sintering (Reaction Bonding, Reaction Sintering).

As the ceramics for use in the first and second matrices of the ceramic-based fiber composite material, various types of ceramics may be employed which include general-purpose ceramics of a non-oxide type such as silicon carbide (SiC), aluminum nitride (AlN), silicon nitride ($Si_3N_4$), boron nitride (BN), sialon (Si-Al-O-N) and the like, ceramics of an oxide type such as alumina, zirconia, titania, mullite, beryllia, kozelite, zircon and the like, and metallic compounds of a silicide type such as molybdenum silicide and the like. These compounds may be used singly or in combination.

There can be used, as ceramic matrices derived by reaction sintering, a reaction-sintered material of $Si_3N_4$ in which $Si_3N_4$ has been generated as a filler, or $Si_3N_4$ and SiC have been generated between SiC particles, and a reaction-sintered material of SiC. Details of both reaction sintering processes are described below.

In the reaction sintering of $Si_3N_4$, a green body having contained $Si_3N_4$ powder as a filler and Si powder is sintered at 1300–1400° C. in a nitrogen atmosphere. Thus, $Si_3N_4$ is generated through nitriding as represented by the reaction formula, $3Si+2N_2 \ldots Si_3N_4$. Reaction sintered $Si_3N_4$ is extremely small in dimensional change before and after being reacted, and therefore, a composite material of high dimensional accuracy is producible by machining $Si_3N_4$ into a molding of a given size at a stage prior to reaction when such ceramics is rather good in machinability and subsequently by sintering the molding.

In the reaction sintering of SiC, a mixture of SiC powder as a filler and C powder is formed, followed by impregnation of molten Si (melting point 1414° C. ) in the resultant sintering at 1420–1700° C. Si so impregnated reacts with C contained in the green body, thereby generating SiC which leads to a densely sintered matrix. In this instance, SiC is considerably small in dimensional change which would be apt to occur from reaction sintering and hence is of advantage to the production of a composite material suitable for use in product components of a complicated shape.

A given reinforcement ceramic fibers are compositely disposed in a predetermined amount in the matrix so as to gain enhanced fracture toughness of the composite material. No particular restriction is placed upon the material of the ceramic fibers, and a ceramic material similar to that used for the matrix can be applied. Specific examples of ceramic fibers are chosen from silicon carbide-type fibers (SiC, Si-C-O, Si-Ti-C-O and the like), SiC-coated fibers (for example, C as a core), alumina fibers, zirconia fibers, carbon fibers, boron fibers, silicon nitride fibers, $Si_3N_4$-coated fibers (for example, C as a core), mullite fibers and the like. At least one member of these ceramic fibers may be used.

The ceramic fibers listed above are incorporated in a fiber volume fraction (Vf) of not smaller than 10% based on the total volume of the composite material. However, fiber volume fractions of more than 60% are too excessive for a matrix to be uniformly formed around each such fiber, and this leaves the problem that the resultant ceramic material invites a sharp decline in strength which would result from voids and other faults. The fiber volume fraction of the ceramic fibers required for desired fiber structure to be attained is preferably in the range of 20–40%.

The diameter and length of the ceramic fibers bring about a significant effect on the fiber arrangement and interfacial state between the fiber and the matrix as well as on the strength properties and fracture energy of the composite material. Ceramic fibers particularly of 3–150 $\mu$m in diameter and of larger than 0.1 mm in length are used in the present invention. Diameters of less than 3 $\mu$m are ineffective for fiber compositeness, whereas diameters of more than 150 $\mu$m or too thick fibers fail to prevent crack growth and also become objectionably rigid, thus involving difficult shaping of the fibers. Smaller lengths than 0.1 mm are also ineffective to protect from crack growth and hence to produce improved toughness.

More specifically, a fibrous ceramics sized to have a diameter of 3–150 $\mu$m and a length of not smaller than 0.1 mm enables a toughness-enhancing mechanism to be effectively achieved, while also coping with the shapes of product components to be produced. To this end, the content of the fiber in the composite material should preferably be not less than 10% since failure to exceed this content results in reduced fiber compositeness.

In addition and preferably, a slide layer of smaller than 5 $\mu$m in thickness is provided on a surface of each fibrous ceramics specified above such that shearing strength may be imparted, at the time of interfacial debonding to an extent not to reduce initial matrix cracking strength, to an interface between the ceramic fiber and the mating matrix and also such that sliding resistance of the fiber may be increased at the time of pulling out after interfacial debonding to thereby enhance fracture energy. This slide layer can be formed by coating carbon (C) or boron nitride (BN) on the fiber surface.

The above slide layer acts to prevent reaction between the ceramic fibers and the corresponding matrix and to cause interfacial debonding under stress load and hence fiber pulling out, thus leading to a composite material having improved toughness.

The ceramic fiber reinforced ceramic matrix composite material according to the first aspect of the present invention may be produced for example by the following process steps. Namely, a plurality of long ceramic fibers (500–3000 in number) each provided on a surface thereof with an interfacial layer where desired are first bundled into a fiber bundle (yarn). Fiber bundles are thereafter oriented in a two- or three-dimensional direction, or woven together so that a preform (fibrous preform) is prepared which is simulated to meet the shape of a product component to be desired. Such preform may be obtained by laminating a plurality of unidirectional sheets wherein fiber bundles are arranged in one direction, or of two-dimensional fabrics wherein fiber bundles are woven in a two-dimensional direction.

Subsequently to preparation of the preform, a first ceramic matrix is formed in an inner space of the preform-constituting fiber bundle (inside the fabric yarn, namely between monofilaments) and at a region adjacent to an outer periphery of the fiber bundle. In providing the first ceramic matrix, there may be adopted an organic a compound-ceramic precursor method, a chemical vapor infiltration method (CVI method) or the like. A powder sintering method may also be used wherein a powder ceramics of less than 1 $\mu$m in average particle diameter (of a submicron level) is filled and then sintered, whereby a first ceramic matrix is obtained. The combination of the CVI method with the powder sintering method is further made possible wherein the CVI method is used to transform a preform into a near matrix having shape retention, followed by sintering of such near matrix by the powder sintering method so that a first ceramic matrix is obtained.

The organic compound-ceramic precursor method is taken to denote a method in which a ceramic matrix is derived from SiC or $Si_3N_4$ synthesized by use of an organic compound (ceramic precursor) as a starting material such as for example a polysilazane, a polycarbosilane, a polysilastyrene, a polyvinylsilane or the like. Specifically, such an organic compound dissolved in a solvent is intermixed with a powder ceramics- of a small particle diameter, and a preform is immersed in the resultant mixed solution and sintered repeatedly several times at a temperature in the order of 1000° C. and in an inert gas atmosphere of Ar, $N_2$ or the like, whereupon a matrix is obtained.

With the organic compound-ceramic precursor method put to use, a first ceramic matrix is formed in an inner minute space of each fiber bundle and at a region adjacent to an outer periphery thereof. This synthesis method ensures that the first ceramic matrix be uniformly formed in the interior portion and outer peripheral region of each of the fiber bundles, while producing some further benefits which will follow. Namely, because compositeness is made attainable at a relatively low temperature with chemical reaction used to advantage, least damage is done to the ceramic fibers, and moreover, the finished composite material can be protected against toughness reduction which would be caused by thermal deterioration of the ceramic fibers. A highly pure matrix is further obtainable since no sintering agents or auxiliaries are necessary.

The CVI method refers to a method in which a matrix-forming starting gas is introduced into a fiber bundle and then reacted in an inner portion of the fiber bundle and on a surface of each ceramic fiber so that a matrix such as of SiC, $Si_3N_4$, $Al_2O_3$ or the like is deposited. A starting gas for formation of a SiC matrix is selected from among $CH_3SiCl_3$—$H_2$, $(CH_3)2SiCl_2$—$H_2$, $SiCl_4$—$CH_4$—$H_2$ and the like. A $Si_3N_4$ matrix-forming gas includes $SiCl_4$—$NH_3$ and the like, while an $Al_2O_3$ matrix-forming gas includes $Al_2O_3$—$H_2$—$CO_2$ and the like.

According to the CVI method, a first matrix can be formed in an inner minute space of a fiber bundle and at a region adjacent to an outer periphery thereof with reliance placed on relatively low temperatures as is noted in the organic compound-ceramic precursor method.

A second ceramic matrix is thereafter formed, by the following procedure, in an inner space of a preform and at a region adjacent to an outer periphery thereof, which space and region are defined except for those where the first ceramic matrix has been formed. To this end, a slurry is first prepared which is composed of a powder ceramics predominantly of a starting material for the second ceramic matrix and of a selected solvent.

As a subsequent step, the preform (fibrous preform) wherein the first ceramic matrix has been formed is put in place in a mold and then impregnated with the above ceramic slurry by means of cast molding (pressure or vacuum casting, or a combination of both methods), whereby a fiber-containing ceramic molding of a given shape is obtained.

Since pressure or vacuum casting is used to fill the matrix constituents in the preform, as mentioned above, increased filling ratio of these constituents is attained with improved density of the ceramic molding so that the resulting matrix can be easily made dense in an ensuing sintering step.

The fiber-containing ceramic molding is then sintered at 1300–1700° C. for about 1–10 hours and under those conditions suited for the constituents of the second ceramic matrix and for the shapes of product components to be produced, whereby a ceramic-based fiber composite material is provided as desired.

In the ceramic-based fiber composite material derived by the aforementioned method, the first ceramic matrix is formed at an inner portion of a microstructural fiber bundle and at a region in the vicinity of an outer periphery thereof, and the second ceramic matrix is formed at a high filling ratio in between fiber bundles of a macrostructural preform and at an outer peripheral region thereof, the first and second ceramic matrices being held in integral relation to each other. In consequence, a relatively dense composite material is made obtainable with a void of less than 10% by volume on the whole.

The first and second ceramic matrices are generally made up of individual ceramics of varying compositions. Both of the matrices may in some cases be composed of a ceramics of one and the same main constituent.

The second ceramic matrix can be sintered or calcined by reaction sintering. In such instance, a slurry of powder ceramics is prepared depending upon the kind of matrices to be used. To be more specific, when the matrix is derivable from reaction-sintered SiC, an SiC powder as an aggregate and a carbon ingredient are used as starting materials, and in the case of the matrix of reaction sintered $Si_3N_4$, $Si_3N_4$ powder as an aggregate and Si powder are used as starting materials.

Such reaction sintering has the advantage that for its adaptability to lower temperatures than other modes of powder sintering methods, it does not nearly have thermally adverse effect on ceramic fibers, thus protecting the latter from getting damaged or marred in regard to toughness.

Each of the first and second ceramic matrices can be formed by sintering powder ceramics selected as starting materials. To effect such matrix formation, the average particle diameter of the starting powder ceramics for use in the first ceramic matrix is set at a small level, as compared with that for the second ceramic matrix, to such an extent as to fill up an inner minute portion of a fiber bundle. This structure contributes greatly to improved density of the first ceramic matrix, thus leading to a composite material having excellent strength properties.

According to the ceramic-based fiber composite material of the first aspect of the present invention described hereinabove, the first ceramic matrix is uniformly formed in an inner portion of a microstructural fiber bundle and at a region adjacent to an outer periphery thereof, while the second ceramic matrix is uniformly formed at a great filling density in between fiber bundles of a macrostructural preform and at an outer peripheral region thereof. Thus, even when applied to a large-sized thick-walled component, such composite material is provided with an almost completely dense matrix as a whole. This ceramic-based fiber composite material, therefore, shows enhanced initial matrix cracking strength and besides retains strength at a high level even after initial matrix cracking.

Since, moreover, the spacings between ceramic fibers are substantially fully filled up with the matrix, all of the fibers compositely disposed have an interface defined together with the matrix. This shows a greater rise in overall interfacial area than void composite materials of the prior art and thus results in a sharp increase in effective interfacial area between the matrix and the fiber. Such specific structure is conducive to increased fiber pulling out after initial matrix cracking and to enhanced fracture energy.

Due to the provision of a composite matrix constituted with first and second ceramic matrices unlike a sole-phase matrix commonly known in the art, the resultant composite material entails a more complicated fracture mechanism and hence exhibits increased resistance to crack propagation, leading to excellent toughness.

Because the ceramic fiber reinforced ceramic matrix composite material is provided on its surface with a coat layer composed solely of a ceramic matrix and having a thickness of larger than 50 µm in such a manner that the ceramic fiber as well as the interfacial site between the fibers and the matrix are prevented from becoming exposed out of a surface of the composite material, strength reduction can be precluded which would arise from surface faults of such composite material. In addition, those ingredients of C and BN used to form a slide layer on a fiber surface can be rendered free from oxidation so that the composite material is effectively protected against impaired strength at elevated temperature. The coat layer noted here is disposed in a thickness of not smaller than 50 µm to sufficiently function to avoid strength failures discussed above.

Disposed at an interface between the slide layer and the ceramic matrix is an interfacial layer composed mainly of at least one member of $Si_3N_4$, SiC and $SiO_2$ and having a thickness of larger than 0.1 µm, and as a result, debonding and pulling out are progressively developed at a plurality of interfaces. This creates a much more complicated mode of fracture, eventually making the composite material strong and tough to a greater degree.

The interfacial layer stated above has a phase and a composition that are different from those of the surrounding matrix. It is preferred, for example, that in the case of a SiC matrix, an interfacial layer be formed predominantly of $Si_3N_4$ and the like and that in the case of a $Si_3N_4$ matrix, an interfacial layer be composed mainly of SiC and the like.

Such interfacial layer may be obtained primarily by two different methods described as follows; that is, a first method is contrived to apply an interfacial layer onto a slide layer-carrying fiber surface by use of a CVD method, whereas a second method lies in disposing a similar layer by means of reaction sintering, details of which will follow.

In the case where an interfacial layer is provided by reaction sintering with reaction-sintered SiC applied for the matrix, a first-stage reaction sintering is first effected in vacuum or in an Ar atmosphere to thereby form a SiC matrix. After completion of the first-stage reaction sintering, a second-stage reaction sintering is performed in a $N_2$ atmosphere. Si left unreacted in an interfacial site in the first-stage reaction sintering is nitrided in the ‚second-stage reaction sintering with eventual provision of an interfacial layer of $Si_3N_4$.

Alternatively, when the matrix is composed of reaction-sintered $Si_3N_4$, a first-stage reaction sintering is conducted to form a $Si_3N_4$ matrix. Si left intact and a source of carbon (C) derived from carbonization of a sizing agent for ceramic fibers, a shape-retaining agent for a preform and the like are then subjected to a second-stage reaction sintering in vacuum or in an Ar atmosphere and with heating at a temperature of higher than the melting point of Si, whereby an interfacial layer based on SiC is obtained.

The ceramic fiber reinforced ceramic matrix composite material, wherein the foregoing ceramic fibers are compositely disposed in a matrix, can be produced for example by the following process steps. Specifically, a three-dimensional fiber structure of a given shape, i.e., a preform (fibrous preform), is prepared with use of a two-or three-dimensional fabric resulting from ceramic fibers provided, where desired, with a slide layer composed of either one or both of C and boron nitride (BN).

On the other hand, a starting slurry is prepared which is made up mainly of starting materials for use in matrices. When the matrix is formed of reaction-sintered SiC, an SiC powder as a filler and a carbon ingredient are dispersed in a solvent or the like so as to obtain a starting slurry. When the matrix is induced from reaction-sintered $Si_3N_4$, $Si_3N_4$ powder as a filler and Si powder are dispersed in a solvent or the like to thereby prepare a starting slurry.

Next, the ceramic fiber preform obtained above is placed in a mold and impregnated with such starting slurry by casting (pressure or vacuum casting, or a combination of both methods) so that a green body of a given shape is provided.

By the use of pressure or vacuum casting in filling the matrix ingredients as mentioned above, the ratio required for these ingredients to be filled in between preforms can be increased, coupled with improved density of the green body. Thus, the resulting matrix can be made easily dense in a subsequent reaction-sintering step. Also preferably, a surface improver may be used in gaining improved wettability between the fiber surface and the starting slurry and hence increased ratio of the matrix ingredients filling up the fiber bundles.

The green composite is subsequently reaction sintered at 1300–1700° C. for about 1–10 hours under those conditions meeting with the matrix ingredients and also with the shapes of product components. In this way, a ceramic fiber reinforced ceramic matrix composite material is produced as desired.

With resort to a two-stage reaction sintering method in which sintering atmospheres are varied as noted in the above reaction sintering operation, there are provided a reaction sintered ceramic matrix and an interfacial layer, respectively. More specifically, a first-stage reaction sintering is done in a given atmosphere to form a reaction-sintered matrix, followed by effectuation of a second-stage reaction sintering different from the first-stage equivalent with the result that an interfacial layer based on at least one member of $Si_3N_4$, SiC and $SiO_2$ is provided at an interface between the fiber and the matrix.

According to the ceramic fiber reinforced ceramic matrix composite material and the method of its production which are provided by the second aspect of the present invention as described hereinabove, a three-dimensional structure (preform) is prepared which results from ceramic a fibers and resembles a product component in shape, the preform being then impregnated with the matrix ingredients and subjected to formation and to subsequent reaction sintering. Thus, the ceramic fiber reinforced ceramic matrix composite material is responsive to complicated shaping of products and also is dense in nature.

Further, since the composite matrix is formed by reaction sintering, a densely sintered structure can be attained even at rather great a fiber volume fraction (Vf). This leads to a composite material having a high degree of fiber compositeness as well as excellent strength at elevated temperature and toughness properties.

Owing to the provision of a coat layer composed of reaction-sintered ceramic matrix alone and disposed on a surface of the composite material, the ceramic fibers can be prevented against exposure out of the composite material. This ensures that the slide layer disposed on a fiber surface be avoided from getting oxidized and that the composite material be protected against reduction in strength at elevated temperature and in toughness.

As a result of use of a two-stage reaction sintering method wherein sintering atmospheres and sintering conditions are varied in the sintering operation, a plurality of interfacial layers can be provided at interfaces between the ceramic fibers and the matrix. These interfacial layers contribute greatly to debonding and pulling out at a plurality of interfacial sites between the fibers and the matrix and develop progressive breakage, thus resulting in enhanced toughness of the composite material to a noticeably large extent.

This is a perspective sectional view, partly enlarged in regard to important structural parts, of one example of the ceramic fiber reinforced ceramic matrix composite material according to the present invention.

FIG. 2

This is an electron photomicrographic representation showing the shape of ceramic fibers ceramics in a broken section of a ceramic-based fiber composite material obtained in Example 1.

BEST MODE OF CARRYING OUT THE INVENTION

Figure 1:
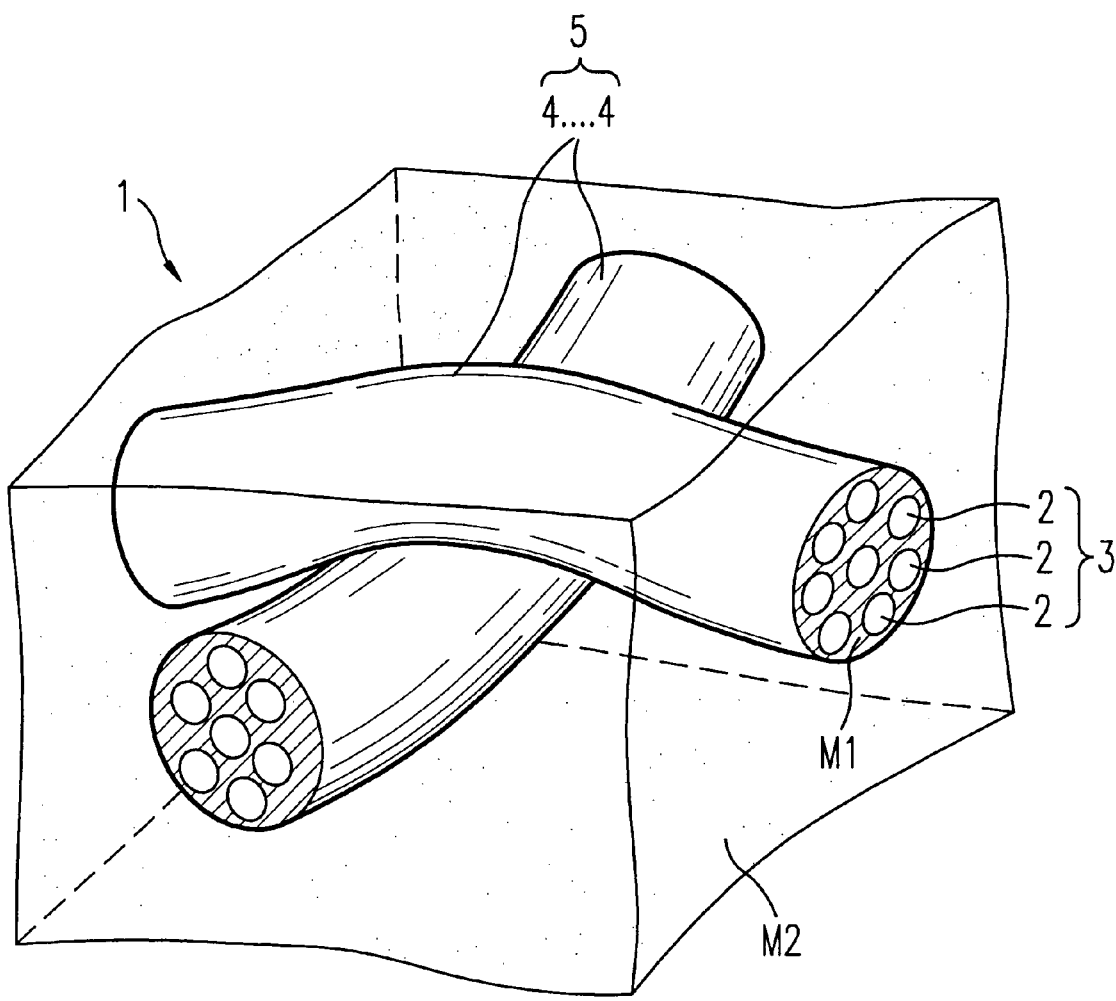
FIG. 1

With reference to the accompanying drawings, one example of the present invention will be described below in greater detail. FIG. 1 is a perspective sectional view, partly enlarged in regard to important structural parts, of one example of the ceramic-based fiber composite material 1 provided in accordance with the invention.

EXAMPLES 1–3

A continuous fiber 2 of SiC having a diameter of 14 μm and coated on its surface with boron nitride (BN) in a thickness of 0.5 μm (trade name: HI-NICALON, manufactured by Nippon Carbon Co., Ltd.) was bundled in a number of 500 into a fiber bundle 3 (yarn). The fiber bundle 3 was woven to prepare a plain-woven cross-woven ceramic fabric 4.

The fabric 4 was thereafter vacuum pressure-impregnated with a xylene solution of a polycarbosilane containing a powder SiC of 1 μm in average particle diameter (precursor polymer for ceramics manufactured by Tohnen Co., Ltd.), and a plurality of sheets of the resulting fabric were laminated with each other to thereby obtain a three-dimensional preform 5 (for use in Example 1).

Here, the lamination gap of the laminate was varied to set the ultimate fiber volume fraction (Vf) of the fabric 4 at 30% by volume based on the total volume of a composite material to be produced. Upon subsequent calcination of the preform 5 at 600–1000° C. in an inert gas atmosphere, a first ceramic matrix MI was formed in an inner space of the fiber bundle 3 and at a region in proximity to an outer periphery thereof in the fabric 4, the first ceramic matrix being composed of SiC and an amorphous phase of Si—C—O. The preform thus obtained was taken for use in Example 1.

Another first ceramic matrix M1 composed of SiC was formed by a CVI method in another fabric 4 similar to that obtained above. A plurality of sheets of the resulting fabric were then laminated one on another with the ultimate fiber volume fraction Vf of the fabric 4 set at 25% by volume after adjustment of the lamination gap, whereby a preform was prepared for use in Example 2.

On the other hand, a powder SiC of 1 μm in average particle diameter and a powder carbon (C) of 0.1 μm in average particle diameter were dispersed in a solvent to prepare a slurry of reaction-sintered powder SiC. This slurry was vacuum pressure-impregnated in a further fabric 4 similar to that stated above. A plurality of sheets of the resulting fabric were laminated one on another with the ultimate fiber volume fraction Vf of the fabric 4 set at 20% by volume after adjustment of the lamination gap, whereby a preform was prepared for use in Example 3.

Thereafter, a second ceramic matrix M2 was formed with respect to each of the preforms of Examples 1–3. The procedure was indicated below.

A starting slurry for use in the second ceramic matrix M2 was first prepared. Namely, an SiC powder as a filler (average particle diameter 10 μm) and a carbon powder ingredient (average particle diameter 0.1 μm) were dispersed in a solvent to prepare a ceramic slurry. By use of pressure casting, the slurry was impregnated and filled in each of the above preforms 5. The casting pressure was set at 5 MPa and the casting time at 5 minutes. After being air-dried, the preform so treated was held in a $N_2$ atmosphere at 600–800° C. for 2 hours so as to degrease an organic binder added as a formed aid. Reaction sintering was conducted in vacuum at 1420° C. for 2 hours, while molten Si was being impregnated in the preform so that a second ceramic matrix M2 composed of SiC was formed and finished with surface treatment. Thus, ceramic fiber reinforced ceramic matrix composite materials 1 were produced which were related respectively to Examples 1–3. As to the preform for use in Example 3, first and second ceramic matrices M1, M2 were formed at a time by means of simultaneous reactions-sintering (co-fire operation).

EXAMPLES 4–6

A continuous fiber 2 of a SiC having a diameter of 14 μm and coated on its surface with carbon (C) in a thickness of 0.5 μm (trade name: HI-NICALON, manufactured by Nippon Carbon Co., Ltd.) was bundled in a number of 500 into a fiber bundle 3 (yarn). The fiber bundle 3 was woven to prepare a plain-woven cross-woven ceramic fabric 4.

The fabric 4 was thereafter vacuum pressure-impregnated with a xylene solution of a polysilazane containing a powder $Si_3N_4$ of 0.6 μm in average particle diameter (precursor polymer for ceramics manufactured by Tohnen Co., Ltd.), and a plurality of sheets of the resulting fabric were laminated with each other to thereby obtain a preform 5 (for use in Example 4). Here, the lamination gap of the laminate was varied to set the ultimate fiber volume fraction (Vf) of the fabric 4 at 45% by volume based on the total volume of a composite material to be produced. Upon subsequent calcination of the preform 5 at 600–1000° C. in an inert gas atmosphere, a first ceramic matrix M1 was formed in an inner space of the fiber bundle 3 and at a region in proximity to an outer periphery thereof in the fabric 4, the first ceramic matrix being composed of $Si_3N_4$ and an amorphous phase of Si—N—O. The preform thus obtained was taken for use in Example 4.

Another first ceramic matrix M1 composed of $Si_3N_4$ was formed by a CVI method in another fabric 4 similar to that prepared above. A plurality of sheets of the resulting fabric were then laminated one on another with the ultimate fiber volume fraction Vf of the fabric 4 set at 40% by volume after adjustment of the lamination gap, whereby a preform was prepared for use in Example 5.

On the other hand, a powder $Si_3N_4$ of 0.6 μm in average particle diameter and a powder $Al_2O_3$ of 0.3 μm in average particle diameter were dispersed in a solvent to prepare a slurry of sialon. This slurry was vacuum pressure-impregnated in a further fabric 4 similar to that stated above. A plurality of sheets of the resulting fabric were laminated one on another with the ultimate fiber volume fraction Vf of the fabric 4 set at 35% by volume after adjustment of the lamination gap, whereby a preform was prepared for use in Example 6.

Thereafter, a second ceramic matrix M2 was formed with respect to each of the preforms of Examples 4–6. The procedure was indicated below.

A starting slurry for use in the second ceramic matrix M2 was first prepared. Namely, a $Si_3N_4$ powder of 0.8 μm in average particle diameter and a carbon powder of 1.0 μm in average particle diameter were dispersed in a solvent to prepare a sialon slurry. By use of pressure casting, the slurry was pressure-impregnated and filled in each of the above preforms 5. The molding pressure was set at 5 MPa and the molding time at 5 minutes. After being air-dried, the preform so treated was held in a $N_2$ atmosphere at 600–800° C. for 2 hours, during which an organic binder added as a molding aid was degreased. Hot-press sintering was then effected in a $N_2$ atmosphere at 400 kgf/cm$^2$ and at 1550° C. for 5 hours so that a second ceramic matrix M2 composed of sialon was formed in an inner space of the preform 5 and at an outer peripheral region thereof, followed by surface treatment as a final step. Thus, fiber composite materials 1 were produced which were related respectively to Examples 4–6.

Comparative Example 1

A plurality of sheets of a plain-woven cross-woven fabric 4 of the same kind as prepared in Examples 1–3 were laminated one on another to thereby provide a preform. Here, the laminate was adjusted in its lamination gap to set the content (fiber volume fraction) of the fabric 4 at 30% by volume based on the total volume of a composite material to be produced.

The above preform was pressure-impregnated with a ceramic slurry for formation of M2 of the same kind as prepared in Examples 1–3 and then subjected to molding. The resultant molding was air-dried and thereafter degreased in a $N_2$ atmosphere at 600° C. for 2 hours. By subsequent heating of the molding in vacuum at 1420° C. for 2 hours, reaction sintering was conducted while molten Si was being impregnated in the molding so that a matrix composed of reaction-sintered SiC was formed and used to produce a ceramic-based fiber composite material for use in Comparative Example 1.

Comparative Example 2

A plurality of sheets of a plain-woven cross-woven fabric 4 of the same kind as prepared in Examples 1–3 were laminated one on another to thereby provide a preform. Here, the laminate was adjusted in its lamination gap to set the content (fiber volume fraction) of the fabric 4 at 30% by volume based on the total volume of a composite material to be produced.

The resulting preform was vacuum pressure-impregnated with a xylene solution of a polycarbosilane a containing the powder SiC stated above. The preform was heat-treated in a $N_2$ gas atmosphere at 600–1000° C. so that a matrix composed of SiC and an amorphous Si—C—O phase was formed and used to produce a ceramic-based fiber composite material for use in Comparative Example 2.

To evaluate the characteristics of the ceramic-based composite fiber materials of Examples 1–6 and of Comparative Examples 1–2, specimens were cut out of these composite materials. Measurement was made with respect to the void fraction of each composite material and the average crystalline size of each matrix as well as the three-point bending strength and breaking energy of the composite material with the results shown in Table 1. Note, the fracture energy was computed from the stress-strain curve determined upon testing of the specimen in respect of its three-point bending strength at room temperature. This fracture energy was indicated as a numerical value obtained when compared with that of the specimen of Comparative Example 1 taken as a reference standard of 1.

TABLE 1

| Specimen No. | Fiber Volume Fraction Vf(vol. %) | Matrix 1 (M1) | | Matrix 2 (M2) | |
|---|---|---|---|---|---|
| | | Starting Material | Preparation Method | Starting Material | Preparation Method |
| Example 1 | 30 | Polycarbosilane + 1 μm SiC Powder | Precursor Method | 10 μm SiC Powder + C Powder (Reaction-Sintered SiC Powder) | Reaction Sintering |
| Example 2 | 25 | SiC | CVI | 10 μm SiC Powder + C Powder (Reaction-Sintered SiC Powder) | Reaction Sintering |
| Example 3 | 20 | 1 μm SiC Powder + C Powder (Reaction-Sintered SiC Powder) | Reaction sintering | 10 μm SiC Powder + C Powder (Reaction-Sintered SiC Powder) | Reaction Sintering |
| Example 4 | 45 | Polysilazane + 0.6 μm $Si_3N_4$ Powder | Precursor Method | 0.8 μm $Si_3N_4$ Powder + $Al_2O_3$ Powder (Sialon Material Powder) | Hot Pressing |
| Example 5 | 40 | $Si_3N_4$ | CVI | 0.8 μm $Si_3N_4$ Powder + $Al_2O_3$ Powder (Sialon Material Powder) | Hot Pressing |
| Example 6 | 35 | 0.6 μm $Si_3N_4$ Powder + $Al_2O_3$ Powder (Sialon Material Powder) | Hot Pressing | 0.8 μm $Si_3N_4$ Powder + $Al_2O_3$ Powder (Sialon Material Powder) | Hot Pressing |
| Comparative Example 1 | 30 | — | — | 10 μm SiC Powder + C Powder (Reaction-Sintered SiC Powder) | Reaction Sintering |
| Comparative Example 2 | 30 | — | — | Polycarbosilane + 1 μm SiC powder | Precursor Method |

| Specimen No. | Average Crystalline Particle Diameter of Matrix (μm) | | Void Fraction (%) | Three-Point Bending Strength $\sigma fRT$ (MPa) | Fracture Energy γ (—) |
|---|---|---|---|---|---|
| | M1 | M2 | | | |
| Example 1 | 1 | 10 | 5 | 350 | 9 |
| Example 2 | — | 10 | 5 | 380 | 7 |
| Example 3 | 1 | 10 | 2 | 400 | 7 |
| Example 4 | 0.6 | 3~4 | 4 | 350 | 10 |
| Example 5 | — | 3~4 | 4 | 420 | 8 |
| Example 6 | 1~2 | 3~4 | 1 | 450 | 10 |
| Comparative Example 1 | — | 10 | 15 | 200 | 1 |
| Comparative Example 2 | — | — | 25 | 100 | 2.5 |

In each of the composite materials of Examples 1–6, a first ceramic matrix is uniformly formed in an inner space of a microstructural fiber bundle and at a region adjacent to an outer periphery thereof, and a second ceramic matrix is densely formed in an inner space of a macrostructural preform prepared by weaving fiber bundles together and at an outer peripheral region thereof. This composite material on the whole has a matrix substantially uniformly filled around each ceramic fibers and hence reveals a noticeably smaller void fraction than those composite materials resulting from conventional methods as evidenced by the results of Table 1. Thus, the initial breaking strength of the matrix is improved to a greater extent.

In addition to the interfacial area between the matrix and the fiber having been greatly increased, a complicated fracture behavior is gained due to two different matrix phases held in integral relation to each other that are distinguished from a single-phase matrix as are seen in Comparative Examples 1–2. Such fracture behavior affords enhanced resistance to crack propagation and increased fracture energy.

Figure 2:
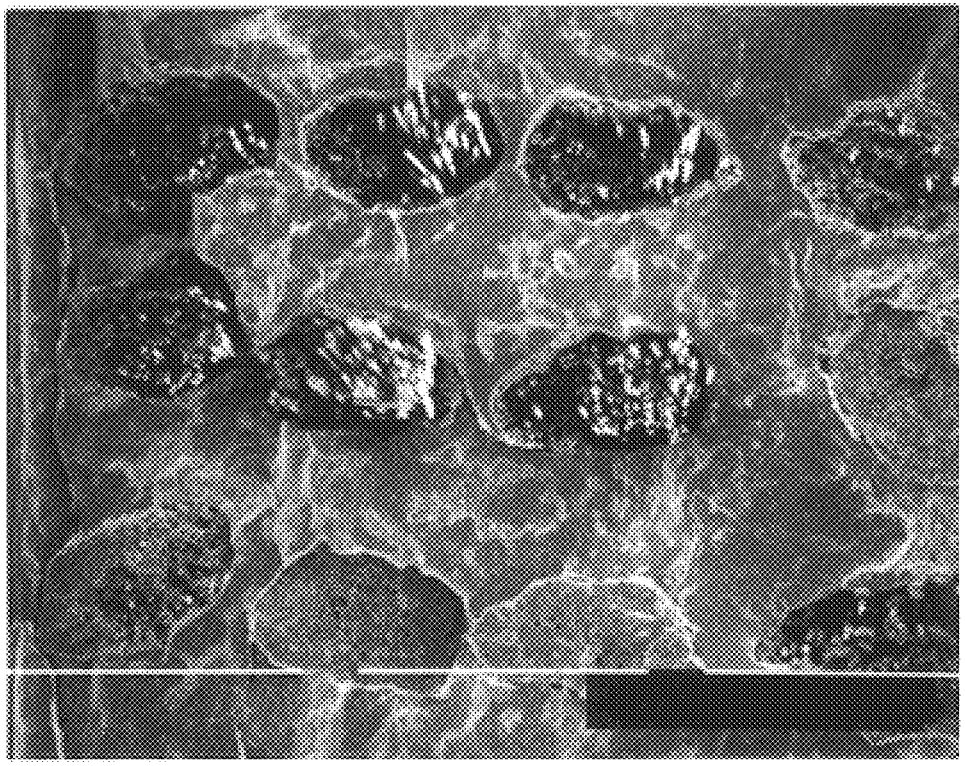

FIG. 2 is a scanning electron microphotograph showing the shape of ceramic fibers in a fracture surface of a ceramic fiber reinforced ceramic matrix composite material obtained in Example 1. Found as shown in black area plurality of broken sections with regard to fiber bundles of a fabric. A first matrix (MI) composed mainly of SiC and Si—C—O is formed in an inner space of each fiber bundle and at a region in the vicinity of an outer periphery thereof, whereas a second ceramic matrix (M2) composed of reaction-sintered SiC is formed between adjacent fiber bundles.

It is clearly observed that debonding has taken place at interfacial sites of fiber bundle-constituting ceramic fibers, and hence, the fibers have been axially pulled out. It has been found that pulling out of the ceramic fibers leads to improved toughness of the composite material.

In the composite material of Comparative Example 1 wherein pressure casting was used for matrix formation, a dense matrix is disposed in a macroscopic spacing between fiber bundles. However, the matrix fails to sufficiently fill in a minute space within the fiber bundle, leaving many voids that would act as starting points to reduce strength. Fracture energy is also decreased because of a small interfacial area between the fiber and the matrix.

In the composite material of Comparative Example 2 in which a whole matrix was synthesized by conversion of an organic polymer into an inorganic nature, a matrix composed of SiC and Si—C—O is arranged in an inner space of each fiber bundle and at an outer peripheral region thereof. Despite this matrix arrangement, denseness is difficult to attain with the result that the matrix itself is extremely low in initial matrix cracking strength.

With reference to the following examples, the second aspect of the present invention will now be described in more detail.

EXAMPLES 7–11

A continuous fiber of a SiC having a diameter of 15 μm (Si—C—O, trade name: HI-NICALON) and provided on its surface with a slide layer of carbon (C) in a thickness of 0.5 μm was bundled in a number of 500 into a fiber bundle (yarn). In Examples 7, 9 and 11, an interfacial layer of $Si_3N_4$ of 0.5 μm in thickness had previously disposed on the fiber bundle by means of a CVD method. In Examples 8 and 10, an interfacial layer was provided by a two-stage reaction sintering operation as will be described later.

The above fiber bundle was woven into a two-dimensional fabric which was then laminated to prepare a preform (fiber preform).

An SiC powder as a filler and a carbon powder as a carbon source were dispersed in a solvent so as to prepare a starting slurry. By means of pressure casting molding, the slurry was impregnated in each above preform to thereby obtain a molding. As shown in Table 2, the content of the slurry in the molding was set to meet a fiber volume fraction (Vf) in the range of 20–40% in a composite material to be produced. Each preform was so prepared as to be uniformly disposed in the matrix.

Among the moldings thus obtained, those provided previously with an interfacial layer and used in Examples 7, 9 and 11 were air-dried and then degreased in a $N_2$ atmosphere at 600° C. for 2 hours. By subsequent heating of the resultant green composites in vacuum at 1420° C., a first-stage reaction sintering was conducted while in impregnation of molten Si into the green composites. Thus, matrices of reaction sintered SiC were formed and used to produce ceramic-based fiber composite materials associated respectively with Examples 7, 9 and 11.

With respect to the green composites for use in Examples 8 and 10 but without previous arrangement of an interfacial layer, a second-stage reaction sintering was effected, in addition to the above first-stage reaction sintering, as explained below so that an interfacial layer was provided. Namely, the molding of each of Examples 8 and 10 was subjected to a second-stage reaction sintering in a $N_2$ atmosphere at 1300–1400° C. where free Si left unreacted in the first-stage reaction sintering was nitrided in the second-stage equivalent, whereby an interfacial layer of reaction-sintered $Si_3N_4$ was disposed at an interfacial site between the matrix and the fiber. Thus, there were produced ceramic fiber reinforced ceramic matrix composite materials respectively for use in Examples 8 and 10.

EXAMPLES 12–16

A continuous fiber of a SiC having a diameter of 15 μm (Si—C—O, trade name: HI-NICALON) and provided on its surface with a slide layer of boron nitride (BN) in a thickness of 0.5 μm was bundled in a number of 500 into a fiber bundle (yarn). In Examples 12, 14 and 16, an interfacial layer of SiC of 0.5 μm in thickness had previously disposed on the fiber bundle by means of a CVD method. In Examples 13 and 15, an interfacial layer was provided by a two-stage reaction sintering operation as will be described later.

The above fiber bundle was woven into a two-dimensional fabric which was then laminated to prepare a preform (fiber preform).

An $Si_3N_4$ powder as a filler and a Si powder were dispersed in a solvent so as to prepare a starting slurry. By means of pressure casting, the slurry was then impregnated in each above preform to obtain a green composites. As shown in Table 2, the content of the slurry in the green composite was set to meet a fiber volume fraction (Vf) in the range of 20–40% in a composite material to be produced. Each preform was so prepared as to be uniformly disposed in the mating matrix.

Among the moldings thus obtained, those provided previously with an interfacial layer and used in Examples 12, 14 and 16 were air-dried and then degreased and heated in a $N_2$ atmosphere at 700–900° C. for 2 hours. In this treatment, a phenol resin added as a shape-retaining agent was carbonized and remained as carbon on fiber surfaces. By subsequent heating of the resultant green composites in vacuum at 1300–1400° C., a first-stage reaction sintering was conducted while Si in the green composites was being nitrided. Thus, matrices of reaction-sintered $Si_3N_4$ were formed and used to produce ceramic fiber reinforced ceramic matrix composite materials associated respectively with Examples 12, 14 and 16.

As to the green composites for use in Examples 13 and 15 but without previous arrangement of an interfacial layer, a second-stage reaction sintering (RB) was effected, in addition to the above first-stage reaction sintering, as explained below so that an interfacial layer was provided. Namely, the green composites of each of Examples 13 and 15 was subjected to a second-stage reaction sintering in vacuum at 1420–1450° C. where residual Si was reacted with the carbon left on the fiber surfaces, whereupon an interfacial layer of reaction-sintered SiC was disposed at an interfacial site between the matrix and the fiber. Thus, there were produced ceramic fiber reinforced ceramic matrix composite materials respectively for use in Examples 13 and 15.

Comparative Examples 3–4

The same green composites and reaction sintering conditions as in Examples 7–11 were followed except that the fiber volume fraction was set at as small as 5% (Comparative Example 3) and at as large as 50% (Comparative Example 4) in the production lines of composite material run by Examples 7–11. Thus, there were produced ceramic fiber reinforced ceramic matrix composite materials for use in Comparative Examples 3 and 4.

Comparative Example 5

The same green composites and reaction sintering conditions as in Example 10 were followed except that the second-stage reaction sintering was omitted in the production line of composite material run by Example 10. A ceramic-based fiber composite material was produced for use in Comparative Example 5.

Comparative Example 6

In the ceramic fiber reinforced ceramic matrix composite material of Example 14, its surface matrix was ground to outwardly expose part of the ceramic fibers and interfacial sites embedded in the matrix. The ceramic fiber reinforced ceramic matrix composite material thus produced was taken for use in Comparative Example 6.

As for the ceramic fiber reinforced ceramic matrix composite materials of Examples 7–16 and of Comparative Examples 3–6, three-point bending strength at 1300° C. and fracture energy were measured with the results listed in Table 2. Fracture energy was computed from the stress-strain curve determined upon testing of the three-point bending strength concerning a specimen cut out of each such composite material. This fracture energy was indicated as compared to that of the specimen of Comparative Example 3 taken as a reference standard of 1.

TABLE 2

| Specimen No. | Slide Layer of Ceramic Fiber Kind | Slide Layer of Ceramic Fiber Thickness (μm) | Interfacial Layer Preparation Method | Interfacial Layer Kind | Interfacial Layer Thickness (μm) | Fiber Volume Fraction Vf(%) | Reaction-Sintered Matrix | Thickness of Coat Layer on Composite Material Surface (μm) | Characteristics of Composite Material Three-Point Bending Strength at 1300° C. (MPa) | Characteristics of Composite Material Fracture Energy (—) |
|---|---|---|---|---|---|---|---|---|---|---|
| Example 7 | C | 0.5 | CVD | $Si_3N_4$ | 0.5 | 20 | SiC | 200 | 430 | 7.4 |
| Example 8 | C | 0.5 | RB | $Si_3N_4$ | 0.2 | 25 | SiC | 200 | 412 | 8.5 |
| Example 9 | C | 0.5 | CVD | $Si_3N_4$ | 0.5 | 30 | SiC | 200 | 400 | 9.0 |
| Example 10 | C | 0.5 | RB | $Si_3N_4$ | 0.2 | 35 | SiC | 200 | 388 | 8.8 |
| Example 11 | C | 0.5 | CVD | $Si_3N_4$ | 0.5 | 40 | SiC | 200 | 380 | 8.1 |
| Example 12 | BN | 0.5 | CVD | SiC | 0.5 | 20 | $Si_3N_4$ | 200 | 430 | 6.9 |
| Example 13 | BN | 0.5 | RB | SiC | 0.2 | 25 | $Si_3N_4$ | 200 | 407 | 7.2 |
| Example 14 | BN | 0.5 | CVD | SiC | 0.5 | 30 | $Si_3N_4$ | 200 | 390 | 8.0 |
| Example 15 | BN | 0.5 | RB | SiC | 0.2 | 35 | $Si_3N_4$ | 200 | 384 | 7.9 |
| Example 16 | BN | 0.5 | CVD | SiC | 0.5 | 40 | $Si_3N_4$ | 200 | 370 | 7.4 |
| Comparative Example 3 | C | 0.5 | CVD | $Si_3N_4$ | 0.5 | 5 | SiC | 200 | 470 | 1.0 |
| Comparative Example 4 | C | 0.5 | CVD | $Si_3N_4$ | 0.5 | 50 | SiC | 200 | 180 | 4.0 |
| Comparative Example 5 | C | 0.5 | — | — | — | 35 | SiC | 200 | 380 | 2.0 |
| Comparative Example 6 | BN | 0.5 | CVD | SiC | 0.5 | 30 | $Si_3N_4$ | 0 | 100 | 2.2 |

As demonstrated by the results of Table 2, it has been observed that three-point bending strength and fracture toughness characteristics can be attained to a remarkably great degree in the composite materials of Examples 7–16 wherein ceramic fibers are compositely disposed in the corresponding matrix, the matrix is formed by reaction sintering, and the matrix is made dense.

It has been found, as contrasted, that poor fiber volume fraction composite and low fracture energy reduced at a rate near to that known in a monolithic material are involved in the composite material of Comparative Example 3 in which too small a fiber volume fraction (Vf) was used.

Another finding is that uniform matrix arrangement is difficult to achieve with the composite material of Comparative Example 4 in which use was made of too large a fiber volume fraction (Vf), because the matrix cannot uniformly be formed surrounding the fiber.

In the composite material of Comparative Example 5 in which no interfacial layer was disposed on a slide layer as by a CVD method or a two-stage reaction sintering method, the ceramic fibers and matrix are firmly bonded to each other via free Si, and hence, three-point bending strength is attained at a relatively high level. Toughness, however, has been proved to drop sharply since no or least slidability is developed between the fiber and the matrix.

In the composite material of Comparative Example 6 in which surface matrix was ground to expose out of a composite material surface part of the ceramic fiber embedded in the matrix, three-point bending strength has been found to be significantly damaged, coupled with considerably decreased fracture energy which is caused by oxidation at a high temperature of the slide layer composed of C and BN and disposed on a fiber surface.

The ceramic fiber reinforced ceramic matrix composite material according to the present invention is structured to have a slide layer and an interfacial layer disposed between the fiber and the matrix. This structure allows the composite material to be easily microscopically controlled, thus enhancing both strength at elevated temperature and toughness.

INDUSTRIAL APPLICABILITY

As stated hereinabove, according to the ceramic fiber reinforced ceramic matrix composite material provided by the first aspect of the present invention, a first ceramic matrix is uniformly formed in an inner space of a fiber bundle and at a region adjacent to an outer periphery thereof, and a second ceramic matrix is formed at a high filling density between fiber bundles of a perform and at an outer peripheral region thereof. Even when applied to large-sized thick-walled components, this composite material as a whole has a matrix structure substantially completely controlled. Thus, initial matrix cracking strength is increased with strength after initial matrix cracking retained at a high level.

Since the matrix is almost completely filled in between ceramic fibers, all of the fibers compositely disposed in the matrix has an interface defined together with the matrix. This specific structure leads, as against the case with void composite materials of the prior art, to a remarkably large area at an interfacial site where the matrix and fiber are contacted with each other. As a result, the effective interfacial area between the matrix and the fiber is conspicuously high and hence is conducive to great pulling out of the ceramic fibers after initial matrix cracking and high fracture energy.

By use of a first matrix and a second matrix held in integral relation to each other as different from a single-phase matrix in conventional practice, the fracture mechanism is rendered more complicated and thus highly resistant to crack propagation. This results in the production of a ceramic fiber reinforced ceramic matrix composite material having excellent toughness.

According to the ceramic fiber reinforced ceramic matrix composite material and the method of its production that are provided by the second aspect of the present invention, a three-dimensional structure (preform) of ceramic fibers is prepared in a shape simulated to match that of a product component, followed by impregnation of ceramic ingredients in the preform and by subsequent heat treatment of the latter through reaction sintering tending to involve least dimensional contraction. Such ceramic fiber reinforced ceramic matrix composite material, therefore, is by nature dense and sufficiently capable of coping with complicated product shapes.

Due to matrix formation by means of reaction sintering, a matrix between ceramic fibers can be densely sintered even at a high fiber volume fraction (Vf) with consequential increase of fiber compositeness. This ensures the provision of a composite material excelling both in strength at elevated temperature and in toughness.

Because a coat layer composed solely of a reaction-sintered matrix is disposed on a surface of the composite material, the ceramic fibers can be protected against exposure out of that surface. This obviates decline in strength and toughness which would be caused by oxidation or thermal deterioration of an interfacial layer disposed on a fiber surface.

A two-stage reaction sintering method, wherein heating atmospheres and heating conditions are varied in a heat treatment operation, is employed in addition to a CVD method. Hence, various types of interfacial layers can be disposed at an interfacial site between the ceramic fibers and the matrix. Such an interfacial layer brings about a complicated fracture behavior that could prevent crack from becoming initiated and propagated in the fiber and matrix, eventually resulting in increased fracture resistance. Thus, the finished composite material can be greatly enhanced in respect of toughness.

What is claimed is:

1. A ceramic fiber reinforced composite material comprising a ceramic matrix, and a fiber preform obtained by bundling a plurality of ceramic fibers into yarn wherein a first ceramic matrix is formed in the inner spaces of said yarn, and a second ceramic matrix is formed in the inner spaces of said fiber preform.

2. A ceramic fiber reinforced composite material according to claim 1, wherein said first ceramic matrix is composed of a ceramic derived by synthesizing a main ingredient of a ceramic precursor as a starting material which is convertible into a ceramic upon calcination, and said second ceramic matrix is composed of a ceramic obtained with use of a powder ceramic as a starting material.

3. A ceramic fiber reinforced composite material according to claim 1, wherein said first ceramic matrix is composed of a ceramic derived by a chemical vapor infiltration method (CVI method), and said second ceramic matrix is composed of a ceramic obtained with use of a powder ceramic as a starting material.

4. A ceramic fiber reinforced composite material according to claim 1, wherein said first and second ceramic matrices are composed of ceramics obtained with use of a powder ceramic as a starting material, and said first ceramic matrix has an average crystalline particle diameter that is smaller than that of said second ceramic matrix.

5. A ceramic fiber reinforced composite material according to claim 1, wherein each of said ceramic fibers is a continuous fiber having on its surface a slide layer containing at least one material of carbon (C) and boron nitride (BN).

6. A ceramic fiber reinforced composite material according to claim 1, wherein said first and second ceramic matrices a composed of a ceramic having a main ingredient of the same composition.

7. A ceramic fiber reinforced composite material according to claim 1, wherein said first ceramic matrix is formed by means of reaction sintering.

8. A ceramic fiber reinforced composite material according to claim 1, wherein said second ceramic matrix is formed by means of reaction sintering.

9. A ceramic fiber reinforced composite material according to claim 1, wherein said composite material has a void fraction of not larger than 10% by volume.

10. A ceramic fiber reinforced composite material comprising a ceramic matrix and a fiber pre-form obtained by bundling a plurality of ceramic fibers into yarn, wherein a first ceramic matrix is formed in the inner spaces of said yarn, and a second ceramic matrix is formed in the inner spaces of said fiber pre-form said ceramic fibers are disposed at a fiber volume fraction (Vf) of greater than 10%, and either one of the first ceramic matrix and the second ceramic matrix is a reaction-sintered ceramic matrix.

11. A ceramic fiber reinforced composite material according to claim 1 or 10, which has on a surface thereof a coating layer composed solely of a ceramic having a thickness of at least 50 $\mu$m.

12. A ceramic fiber reinforced composite material according to claim 10, wherein each of said ceramic fibers is a continuous fiber having on its surface a slide layer containing at least one material of carbon and boron nitride (BN).

13. A ceramic fiber reinforced composite material according to claim 5 wherein an interfacial layer is disposed at the interface between said slide layer and said ceramic matrix, said interfacial layer being composed predominantly of at least one material of $Si_3N_4$, SiC and $SiO_2$ and having a thickness of more than 0.1 $\mu$m.

14. A ceramic fiber reinforced composite material according to claim 13, wherein said interfacial layer is obtained by a CVD method.

* * * * *